(12) United States Patent
Cambrea

(10) Patent No.: US 9,116,041 B1
(45) Date of Patent: Aug. 25, 2015

(54) SYSTEM AND METHOD FOR SPECTRAL INFRARED THERMAL IMAGING

(71) Applicant: The United States of America as represented by the Secretary of the Navy, Washington, DC (US)

(72) Inventor: Lee R. Cambrea, Ridgecrest, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 229 days.

(21) Appl. No.: 13/624,569

(22) Filed: Sep. 21, 2012

Related U.S. Application Data

(60) Provisional application No. 61/658,302, filed on Jun. 11, 2012.

(51) Int. Cl.
G01J 5/02 (2006.01)
G01J 3/42 (2006.01)
G01J 3/28 (2006.01)
G01J 5/10 (2006.01)

(52) U.S. Cl.
CPC .... G01J 3/42 (2013.01); G01J 3/28 (2013.01); G01J 5/10 (2013.01)

(58) Field of Classification Search
CPC ......... G01N 21/3563; G01J 3/42; G01J 5/522

USPC ............... 250/339.02, 339.06, 339.12
See application file for complete search history.

(56) References Cited

U.S. PATENT DOCUMENTS

| | | | |
|---|---|---|---|
| 5,781,336 A | 7/1998 | Coon et al. | |
| 6,208,459 B1 | 3/2001 | Coon et al. | |
| 6,414,305 B1 * | 7/2002 | Bendall | 250/252.1 |
| 6,717,148 B2 * | 4/2004 | Kansakoski et al. | 250/339.11 |
| 7,462,809 B2 | 12/2008 | DiMarzio et al. | |
| 2004/0256558 A1 * | 12/2004 | Kuerbitz et al. | 250/330 |
| 2005/0170521 A1 * | 8/2005 | Archibald | 436/164 |
| 2006/0022139 A1 * | 2/2006 | Garber et al. | 250/330 |
| 2009/0159798 A1 * | 6/2009 | Weida et al. | 250/330 |
| 2012/0018638 A1 * | 1/2012 | Patel et al. | 250/339.12 |

* cited by examiner

Primary Examiner — David J Makiya
Assistant Examiner — Kenneth J Malkowski
(74) Attorney, Agent, or Firm — James M. Saunders

(57) ABSTRACT

A thermal imaging system includes at least one light source in the line of sight of at least one substance of interest. At least one thermal imager is in the line of sight of the substance of interest and is associated with the light source. The light source is configured to selectively transmit infrared wavelengths in the range of about 2 to 25 microns to irradiate the substance of interest. The thermal imager is configured to detect thermal responses of the irradiated substance of interest.

8 Claims, 3 Drawing Sheets

SYSTEM AND METHOD FOR SPECTRAL INFRARED THERMAL IMAGING

CROSS-REFERENCE TO RELATED APPLICATIONS

This is a non-provisional application, claiming the benefit of parent provisional application No. 61/658,302 filed on Jun. 11, 2012, whereby the entire disclosure of which is incorporated hereby reference.

STATEMENT REGARDING FEDERALLY SPONSORED RESEARCH OR DEVELOPMENT

The invention described herein may be manufactured and used by or for the government of the United States of America for governmental purposes without the payment of any royalties thereon or therefor.

FIELD OF THE INVENTION

The invention generally relates to stand-off detection of substances, and more particularly, to spectrally detecting hazards in a safe manner.

Figure 1:
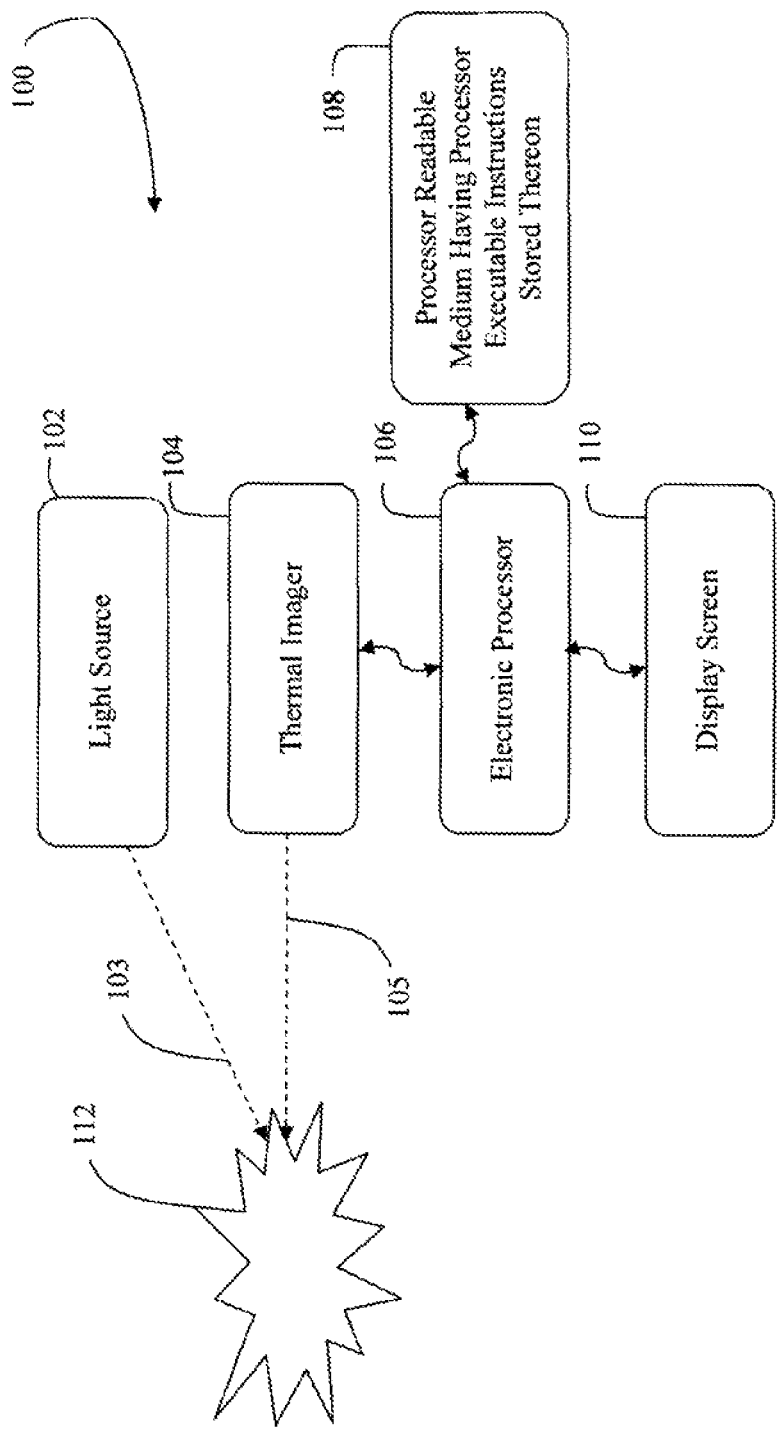
FIG. 1 is a conceptual operating scenario of a spectral infrared thermal imaging system, according to embodiments of the invention.

It is to be understood that the foregoing general description and the following detailed description are exemplary and explanatory only and are not to be viewed as being restrictive of the invention, as claimed. Further advantages of this invention will be apparent after a review of the following detailed description of the disclosed embodiments, which are illustrated schematically in the accompanying drawings and in the appended claims.

DETAILED DESCRIPTION OF EMBODIMENTS OF THE INVENTION

The invention generally relates to stand-off detection of substances, and more particularly, to spectrally detecting hazards in a safe manner.

Stand-off detection of bulk and trace substances is an important ability for utilization in the field. Being able to identify risks, from a safe distance, has the potential to save lives and increase mission preparedness. Current stand-off chemical detection methods are either not valid for long enough distances, cannot identify key hazards, or are unsafe to use in populated areas. This invention provides a method to spectrally detect hazards while remaining eye-safe.

Stand-off detection will be accomplished by using a combination of narrowband light sources (or narrowly filtered broadband light sources) to selectively excite molecules of interest from a distance. Embodiments of the invention offer the ability to detect substances of interest, sometimes referred to as molecules of interest, at distances greater than arms reach. Longer distances would employ stronger, more powerful light sources.

The excited molecules can then be detected using thermal imaging. The excitation source wavelength can be determined by matching to the wavelengths of absorption peaks in the infrared spectrum of the molecule of interest. By using an array of light sources that are rapidly scanned or a filtered broadband source the probability of molecular identification and detection increases due to the increase in wavelengths tested. The array or broadband source also eliminates the need for prior identification of the molecule of interest.

The ability to identify hazards from a safe distance has always been a huge advantage. Technology has progressed from standing on hills and overlooking a valley to hyperspectral imaging where satellite or air based images are used to determine terrain types and even how much water crops are receiving. Although hyperspectral imaging has come a long way from differentiating tanks and trees, it is still not capable of identifying a small pile of chemical waste or trace amounts of a hazard on a surface. Embodiments of the invention use the natural vibration of molecules to probe their identity from a distance with detection being the resulting thermal image from the increase in molecular vibration.

Embodiments of the invention use multiple narrow band (or a narrowly filtered broadband) sources in the infrared region, approximately 2 to 25 microns in wavelength, of the electromagnetic spectrum. The selection of the source wavelength corresponds to absorption peaks in the infrared spectrum for the analyte of interest. When light at the same wavelength as an absorption peak interacts with an analyte, the molecules will begin vibrating more rapidly causing a modest increase in temperature. This increase in temperature can be detected by thermal imaging techniques. By scanning through a variety of wavelengths one can effectively determine where each of the absorption peaks occur (absorption=heat) creating a spectrum of thermal data that directly correlates to infrared spectral data. This allows for positive identification of most organic analytes.

Although embodiments of the invention are described in considerable detail, including references to certain versions thereof, other versions are possible. Examples of other versions include conducting tasks in different order than described herein. Therefore, the spirit and scope of the appended claims should not be limited to the description of versions included herein.

In the accompanying drawings, like reference numbers indicate like elements. FIG. 1 illustrates a conceptual operating scenario of a spectral infrared thermal imaging system, according to embodiments of the invention, and depicted as reference character 100. Embodiments of the invention generally relate to a thermal imaging system, including at least one light source 102 in the line of sight of at least one substance of interest 112. At least one thermal imager 104 is associated with the light source 102. The light source 102 is configured to selectively transmit infrared wavelengths in the range of about 2 to 25 microns to irradiate the substance of interest 112. Once irradiated, the substance of interest 112 may be referred to as the irradiated substance of interest, without detracting from the merits or generality of embodiments of the invention. The thermal imager 104 is in the line of sight of the irradiated substance of interest 112 and is configured to detect thermal responses of the irradiated substance of interest 112.

Figure 2:
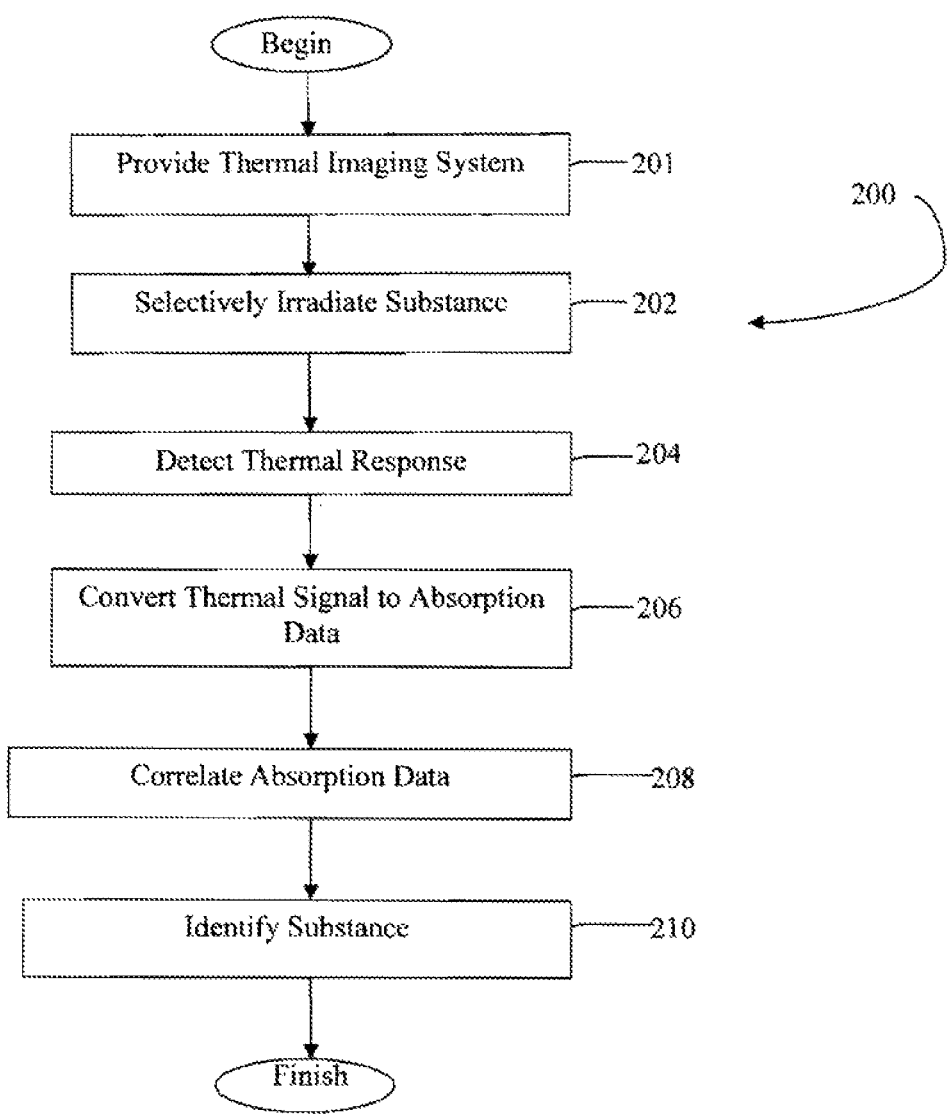
FIG. 2 is a block process diagram of a method for spectral infrared thermal imaging, according to embodiments of the invention.

FIG. 2 depicts a block process diagram of a method for spectral infrared thermal imaging, according to embodiments of the invention. Another embodiment of the invention generally relates to a method for identifying substances, and is depicted as reference character 200. The method includes providing a thermal imaging system (as described and shown in FIG. 1) having an infrared spectral database of organic substances. The thermal imaging system is configured to identify at least one substance of interest (task 201).

The thermal imaging system is used to irradiate the substance of interest by selectively transmitting infrared wavelengths in the range of about 2 to 25 microns at the substance of interest (task 202). Specifically, an infrared light source is used to irradiate the substance of interest and, when irradiated, the substance of interest may be referred to as the irradiated substance of interest. Thermal response of the irradiated substance of interest is detected by the thermal imaging system (task 204). Thermal response is an observed thermal signal. The observed thermal signal as a function of wavelength is converted to absorption data of the irradiated substance of interest (task 206). An increase in temperature of the irradiated substance of interest corresponds to at least one unique absorption peak in the infrared spectrum. The absorption data is correlated with the unique absorption peak (task 208).

Correlating may be performed using instructions such as, for example, executable commands using algorithms that are executed by an electronic processor (reference character 106 in FIG. 1). The irradiated substance of interest is identified by comparing the correlated absorption data to the infrared spectral database of organic substances (task 210). Peak positions and shapes of substances in the infrared spectral database are examined and compared to the substance of interest. The identification (task 210) of the substance of interest is based on the closest (best) match amongst the substances in the database. A person having ordinary skill in the art will recognize that the infrared spectral database may be a commercially available library of infrared responses of various organic substances.

In yet another embodiment, as shown in FIG. 1 and depicted as reference character 100 in FIG. 1, a spectral infrared thermal imaging machine for use in detecting organic substances, includes a light source 102 in the line of sight of an organic substance of interest 112. A thermal imager 104 is attached to the light source 102. The thermal imager 104 is in the line of sight of the organic substance of interest 112. An electronic processor 106 is in electrical communication with the thermal imager 104. The light source 102 is configured to selectively transmit wavelengths in the range of about 2 to 25 microns to irradiate the organic substance of interest 112. The thermal imager 104 is configured to detect thermal responses of the irradiated organic substance of interest 112. The electronic processor 106 is configured with an infrared spectral database of known organic substances 112. The electronic processor 106 is configured to correlate wavelengths of transmitted infrared light and thermal responses of the irradiated organic substance of interest 112. A display screen 110 is in electrical communication with the electronic processor 106. The display screen 110 is configured to visually output thermal responses of the irradiated organic substance of interest 112.

In embodiments, a dashed line 103 (FIG. 1) depicts the light source 102 as being in the line of sight of the substance of interest 112 and emitting infrared wavelengths that irradiate the substance of interest. In some embodiments, the light source 102 is at least one narrow band infrared light source. In other embodiments, the light source 102 is at least one narrowly filtered broad band infrared light source. Some examples of light sources 102 include, but are not limited to, lasers, glowbars, and blackbody lights.

A person having ordinary skill in the art will recognize that thermal response is synonymous with the terms heat emission and temperature increase. Likewise, thermal response yields a thermal signal, which is measurable and quantifiable.

Selective transmission of infrared wavelengths is based on application-specific conditions. This is largely determined by mission factors including, but not limited to, substances suspected to be present in a given environment based on historical factors and various information gathering techniques.

In embodiments, the substance of interest 112 is an organic analyte and may be in any phase—solid, liquid, or gas. Examples of organic analytes that embodiments of the invention can detect include, but are not limited to, explosives, drugs, plastics, nitrates, hydrocarbons, and polymers.

A dashed line 105 depicts the thermal imager 104 being in the line of sight of the substance of interest 112. The thermal imager 104 detects heat from the substance of interest. The thermal imager 104 may include a display screen configured to visually depict thermal responses of the irradiated substance of interest. The display screen may be referred to as a thermal imager display screen to differentiate it from the electronic processor display screen 110. The thermal imager display screen is included with the thermal imager 104, and as such is not specifically shown in FIG. 1. Thermal imager 104 examples include, but are not limited to, thermal cameras with pseudo color or graphical displays, array detectors, and thermal goggles. The thermal imager 104 is configured with an infrared spectral database of known organic substances.

In some embodiments, at least one electronic processor 106 is configured to communicate with the thermal imager 104. At least one electronic processor display screen 110 is associated with the electronic processor 106. The electronic processor 106 converts the observed thermal signal as a function of wavelength to absorption data. The electronic processor 106 is configured to correlate wavelengths of transmitted infrared light and thermal responses of the irradiated substance of interest 112 at respective wavelengths. The electronic processor display screen 110 is configured to visually depict the thermal responses at the respective wavelengths of the irradiated substance of interest.

The electronic processor 106 constructs a plot of wavelength (from the light source 102) versus thermal response (from the irradiated substance of interest 112). The wavelength at which there is a thermal response is based on the substance of interest 112. In general, scanning all wavelengths for all substances yields a closest (best) match and hence, identification of the substance of interest. When a user is searching for a particular threat such as, for example, an energetic, fewer wavelength scans may be performed.

System and articles of manufacture embodiments including an electronic processor 106 may also include one or more non-transitory processor-readable medium (devices, carriers, or media) 108 having stored thereon a plurality of instructions, that, when executed by the electronic processor (typically a central processing unit—an electronic circuit which executes computer programs, having a processing unit and a control unit) 106, cause the processor to process/manipulate/act on data according to the plurality of instructions.

The non-transitory medium 108 can be any non-transitory processor 106 readable medium (media), including, for example, a magnetic storage media, "floppy disk", CD-ROM, RAM, a PROM, an EPROM, a FLASH-EPROM, any other memory chip or cartridge, a file server providing access to the programs via a network transmission line, or holographic unit. Of course, those skilled in the art will recognize that many modifications may be made to this configuration without departing from the scope. In some system embodiments, the electronic processor 106 is co-located with the processor readable medium 108. In other system embodiments, the electronic processor 106 is remotely located from the processor readable medium 108. Additionally, some system embodiments may include communication devices allowing for the exchange of data to and from other systems such as, for example, satellite networks.

Figure 3:
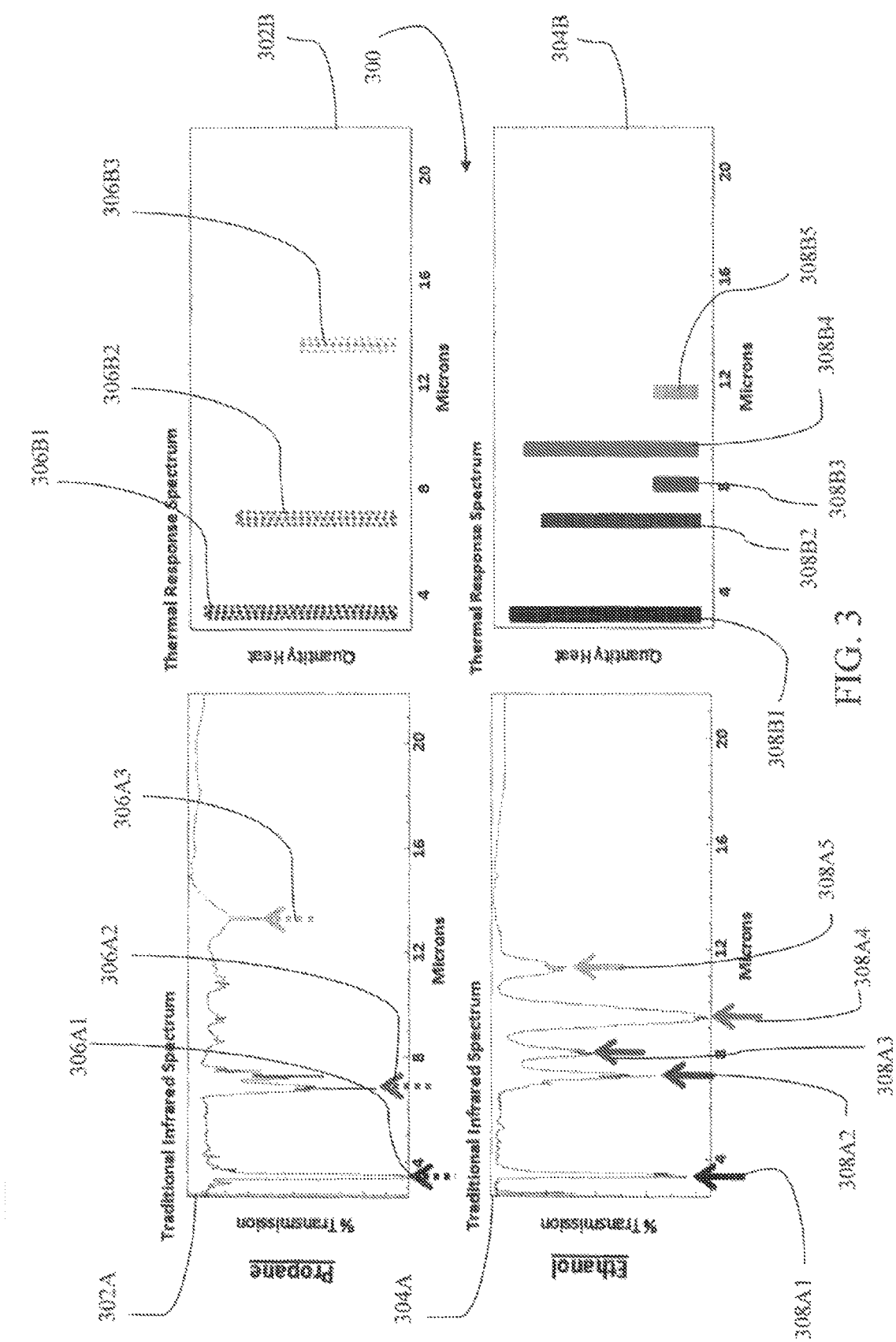
FIG. 3 is a graphical comparison of a traditional infrared spectrum versus a thermal response spectrum for two organic compounds, according to embodiments of the invention.

FIG. 3 is a graphical comparison of a traditional infrared spectrum versus a thermal response spectrum for two organic compounds, according to embodiments of the invention, and is depicted as reference character 300. As shown, the top spectrum (graphs 302A and 302B) is propane and the bottom spectrum (graphs 304A and 304B) is ethanol. Graphs 302A and 304A represent the traditional infrared spectrum, showing absorption peaks/troughs for the given organic compounds. Graphs 302B and 304B represent the thermal response spectrum for the given organic compounds, according to embodiments of the invention.

Arrows (reference characters 306A1, A2, & A3 and 308A1, A2, A3, A4, & A5) indicate spectral absorptions. By choosing light sources at each of the wavelengths of absorption, the user would be able to recreate this spectral data thermally. Arrows (designated by reference characters 306A1 & A2) exist in both compounds at the same wavelength. Arrows (designated by reference characters 308A3, A4, and A5) identify ethanol. The single arrow (designated by reference character 306A3) identifies propane.

The converting, correlating (and comparing), and identifying tasks (tasks 206, 208, & 210 in FIG. 2) are understood, as an example, by referring simultaneously to FIGS. 1 & 3. The conversion (task 206 in FIG. 2) combines wavelengths (the x-axis in graphs 302B and 304B) from the light source (102 in FIG. 1) with the thermal response (the observed thermal signal or "heat") (the y-axis in graphs 302B & 304B) measured by the thermal imager (104 in FIG. 1), resulting in an observed thermal response signal (the thermal response spectrum) shown in graphs 302B and 304B. One having ordinary skill in the art will recognize that wavelength is measured in distances such as, for example, in microns ($1\times10^{-6}$ meters).

Comparing the thermal response graphs (302B and 304B) with the traditional infrared spectrum graphs (302A and 304A), one skilled in the art will recognize that the thermal response spectrums associated with embodiments of the invention are equally as reliable as traditional infrared spectrum analysis. This cannot be overlooked because embodiments of the invention do not employ spectrometer devices because thermal response is the measured feature. Employing a system without spectrometer devices results in embodiments of the invention being simpler and more efficient, while yielding the same results as traditional infrared spectrum analysis devices.

Thus, for a visual comparison, graphs 302B and 304B identify the same organic compounds as graphs 302A and 304A. Bars 306B1, B2, & B3 match with the peaks/troughs identified by arrows 306A1, A2, & A3. Similarly, bars 308B1, B2, B3, B4, & B5 match with the peaks/troughs identified by arrows 308A1, A2, A3, A4, & A5. Since heat is synonymous with absorption, graphs 302A and 302B will appear to be identical in the matching of size and shape of bars (thermal response spectrum) and peaks/troughs (traditional infrared spectrum). Similarly, graphs 304A and 304B will also appear to be identical.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A method for measuring thermal response using a thermal imager to identify organic substances, comprising:

providing a thermal imager comprising an array detector with a pseudo color or graphical display, said thermal imager configured to measure thermal response intensity, said thermal imager configured with a thermal imager display screen, an electronic processor, and an infrared spectral database of organic substances, wherein said thermal imager is configured to identify at least one substance of interest;

wherein said infrared spectral database of organic substances is a library of infrared responses corresponding to absorption data as a function of wavelength of known organic substances, said infrared responses referred to as an infrared spectrum;

irradiating said at least one substance of interest with a light source associated with said thermal imager, said irradiating executed by selectively transmitting infrared light source wavelengths in the range of about 2 to 25 microns at said at least one substance of interest;

using said thermal imager to detect thermal response of the irradiated substance of interest at the selectively transmitted infrared light source wavelengths, wherein said thermal response is an observed thermal signal corresponding to an increase in molecular vibration of the irradiated substance of interest at the selectively transmitted infrared light source wavelengths;

electronically converting the observed thermal signal to absorption data by combining the observed thermal signal detected from said thermal imager and the light source wavelengths transmitted from said light source, and plotting the observed thermal signal on a y-axis and the light source wavelengths on an x-axis, wherein said plot is an electronic construction of the observed thermal signal as a function of light source wavelength;

displaying said plot of the observed thermal signal as a function of light source wavelength on said thermal imager display screen, wherein said plot of the observed thermal signal as a function of light source wavelength is visually depicted as at least one rectangular bar;

displaying an electronic plot of said infrared spectrum on said thermal imager display screen, wherein said plot of the absorption data as a function of wavelength is visually depicted as at least one unique absorption peak in the infrared spectrum; and electronically correlating said electronic construction of the observed thermal signal as a function of light source wavelength with said infrared spectrum to identify the irradiated at least one substance of interest by comparing said correlated electronic construction of the observed thermal signal as a function of light source wavelength to said infrared spectrum, said comparing task further comprising matching in size and shape said at least one unique absorption peak with said at least one rectangular bar, and displaying said match as a plot of said at least one unique absorption peak beside said at least one rectangular bar on said thermal imager display screen.

2. The method according to claim 1, wherein said at least one light source is at least one narrow infrared light source.

3. The method according to claim 1, wherein said at least one light source is at least one narrowly filtered broad band infrared light source.

4. The method according to claim 1, wherein the at least one substance of interest is an organic analyte.

5. The method according to claim 1, wherein said at least one thermal imager is configured with an infrared spectral database of known organic substances.

6. The method according to claim 1, wherein said at least one light source is a laser.

7. The method according to claim 1, wherein said at least one light source is a glow bar.

8. The method according to claim 1, wherein said at least one light source is a blackbody light.

\* \* \* \* \*